US012577993B2

(12) United States Patent　(10) Patent No.: US 12,577,993 B2
Pajak et al.　(45) Date of Patent: Mar. 17, 2026

(54) REDUCED PROFILE PISTON ADJUSTER

(71) Applicant: Honeywell International Inc.,
Charlotte, NC (US)

(72) Inventors: William E Pajak, Chesterton, IN (US);
Jonathan T. Beehler, Bremen, IN
(US); Brian Shula, South Bend, IN
(US)

(73) Assignee: Honeywell International Inc.,
Charlotte, NC (US)

( * ) Notice: Subject to any disclaimer, the term of this
patent is extended or adjusted under 35
U.S.C. 154(b) by 391 days.

(21) Appl. No.: 18/193,166

(22) Filed: Mar. 30, 2023

(65) Prior Publication Data

US 2024/0328469 A1　Oct. 3, 2024

(51) Int. Cl.
| | |
|---|---|
| F16D 55/40 | (2006.01) |
| F16D 65/00 | (2006.01) |
| F16D 65/18 | (2006.01) |
| *F16D 55/00* | (2006.01) |
| *F16D 121/04* | (2012.01) |
| *F16D 125/06* | (2012.01) |

(52) U.S. Cl.
CPC ......... F16D 55/40 (2013.01); F16D 65/0056
(2013.01); F16D 65/18 (2013.01); *F16D*
*2055/0008* (2013.01); *F16D 2055/0075*
(2013.01); *F16D 2121/04* (2013.01); *F16D*
*2125/06* (2013.01)

(58) Field of Classification Search
None
See application file for complete search history.

(56) References Cited

U.S. PATENT DOCUMENTS

| | | | |
|---|---|---|---|
| 3,990,547 | A | 11/1976 | Plaat |
| 4,180,147 | A | 12/1979 | Tjarksen et al. |
| 4,449,616 | A | 5/1984 | Musser, Jr. et al. |
| 4,503,950 | A | 3/1985 | Anderson |
| 4,751,985 | A | 6/1988 | Chambers |
| 4,815,359 | A | 3/1989 | Black |
| 5,154,262 | A | 10/1992 | Berwanger |

(Continued)

FOREIGN PATENT DOCUMENTS

| | | | | | |
|---|---|---|---|---|---|
| CN | 113944708 | A | * | 1/2022 | ............. F16D 65/14 |
| EP | 0555819 | A1 | | 8/1993 | |

(Continued)

OTHER PUBLICATIONS

WO-2022243623-A1: English Machine Translation (Year: 2022).*

(Continued)

*Primary Examiner* — Melanie Torres Williams
(74) *Attorney, Agent, or Firm* — Shumaker & Sieffert,
P.A.

(57) ABSTRACT

In some examples a piston-bushing assembly includes a
bushing with an opening and a piston slidably disposed
within the bushing. The piston includes a bottom end
disposed within the bushing and an exterior end extending a
distance outward from the opening of the bushing. The
exterior end of the piston is configured to engage with a disc
stack of a brake assembly. The piston-bushing assembly also
includes an adjuster tube including a first end of the adjuster
tube, wherein, when the piston-bushing assembly is in an
unactuated state, a length between the first end of the
adjuster tube and the bottom end of the piston defines a
step-back gap.

20 Claims, 5 Drawing Sheets

(56) References Cited

U.S. PATENT DOCUMENTS

| | | | |
|---|---|---|---|
| 5,205,382 A | 4/1993 | Edmisten | |
| 5,219,046 A | 6/1993 | Clark | |
| 5,355,774 A | 10/1994 | Ditlinger | |
| 6,016,892 A | 1/2000 | Berwanger | |
| 6,234,279 B1 | 5/2001 | Jankowski et al. | |
| 9,476,473 B2 | 10/2016 | Gonzalez et al. | |
| 10,968,971 B2 | 4/2021 | Herrmann et al. | |
| 2020/0049216 A1 | 2/2020 | Herrmann et al. | |

FOREIGN PATENT DOCUMENTS

| | | | | |
|---|---|---|---|---|
| EP | 3734104 A1 | 11/2020 | | |
| GB | 1204033 A | 9/1970 | | |
| JP | 05180252 | 7/1993 | | |
| WO | WO-2022243623 A1 * | 11/2022 | ............... | B24B 5/00 |

OTHER PUBLICATIONS

CN-113944708-A: English Machine Translation (Year: 2022).*
Response to Extended Search Report dated Aug. 30, 2024, from counterpart European Application No. 24161513.7 filed Nov. 7, 2024, 41 pp.
"How It Works: Spring Engaged Friction Brake", MACH III Motion Control Solutions, (Retrieved from: https://www.machiii.com/resources/how-our-products-work/how-it-works-spring-engaged-friction-brake/; Accessed on: Nov. 23, 2022; 2 pp.
Extended Search Report from counterpart European Application No. 24161513.7 dated Aug. 30, 2024, 10 pp.

* cited by examiner

REDUCED PROFILE PISTON ADJUSTER

TECHNICAL FIELD

The present disclosure relates to brake assemblies for a vehicle.

BACKGROUND

Vehicles, such as aircrafts, may use a wheel brake assembly that includes a multi-disc brake assembly. For example, the multi-disc brake assembly may include a disc stack comprising plurality of rotor discs engaged with a wheel and a plurality of stator discs interleaved with the rotor discs. The rotor discs and wheel are configured to rotate around an axle, while the stator discs remain stationary. To decelerate rotational motion of a rotating wheel, the brake assembly may displace pistons against a pressure plate to compress the rotating rotor discs engaged with the wheel against the stationary stator discs, therefore producing torque that decelerates the rotational motion of the wheel. In some examples, the rotor discs may be engaged with the wheel via rotor drive keys positioned on an interior surface of the wheel. In some examples, stator discs may be engaged with a stationary torque tube surrounding the axle via splines positioned on the torque tube. In some such examples, the brake assembly may be configured to compress the rotor discs and the stator discs between the piston and a backing plate supported by the torque tube.

SUMMARY

The present disclosure describes example brake assemblies, including a piston-bushing assembly with a reduced-profile adjustment mechanism. During braking, a piston of the piston-bushing assembly may extend from a bushing to engage with a brake disc stack to reduce and/or substantially prevent a rotation of a wheel. As the material of the disc stack wears away, an adjustment mechanism of the piston-bushing assembly may be configured to allow the piston to extend further from the bushing to continue to engage the brake disc state. The adjustment mechanism may include an adjuster tube over an expander and adjuster pin, where the step-back gap is defined by the distance between a bottom end of the adjuster tube and the base of the piston. Upon actuation, the base of the piston may traverse the step-back gap and apply a compressive force directly on the bottom end of the adjuster tube to translate the adjuster tube with respect to the expander. By allowing the base of the piston to act directly on the adjuster tube, the adjustment mechanism removes the need to include other parts in the piston-bushing assembly that may have been required to pull the adjuster tube over the expander, thereby reducing the profile of the adjustment mechanism.

In some examples a piston-bushing assembly includes: a bushing including an opening; a piston slidably disposed within the bushing, the piston including: a bottom end disposed within the bushing; and an exterior end extending a distance outward from the opening of the bushing and configured to engage with a disc stack of a brake assembly; and an adjuster tube including a first end of the adjuster tube, wherein, when the piston-bushing assembly is in an unactuated state, a length between the first end of the adjuster tube and the bottom end of the piston defines a step-back gap.

In some examples, an assembly includes: a wheel configured to rotate around a wheel axis; a brake assembly including: a disc stack including a rotor disc and a stator disc, wherein the rotor disc is rotationally coupled to the wheel, and wherein the wheel is configured to rotate relative to the stator disc; and an actuator configured to compress the disc stack via a piston-bushing assembly including: a bushing including an opening; a piston slidably disposed within the bushing, including: a bottom end disposed within the bushing; and an exterior end extending a distance outward from the opening of the bushing and configured to engage with the disc stack of the brake assembly; and an adjuster tube including a first end of the adjuster tube, wherein, when the piston-bushing assembly is in an unactuated state, a length between the first end of the adjuster tube and the bottom end of the piston defines a step-back gap.

The details of one or more examples are set forth in the accompanying drawings and the description below. Other features, objects, and advantages will be apparent from the description and drawings, and from the claims.

DETAILED DESCRIPTION

Figure 1:
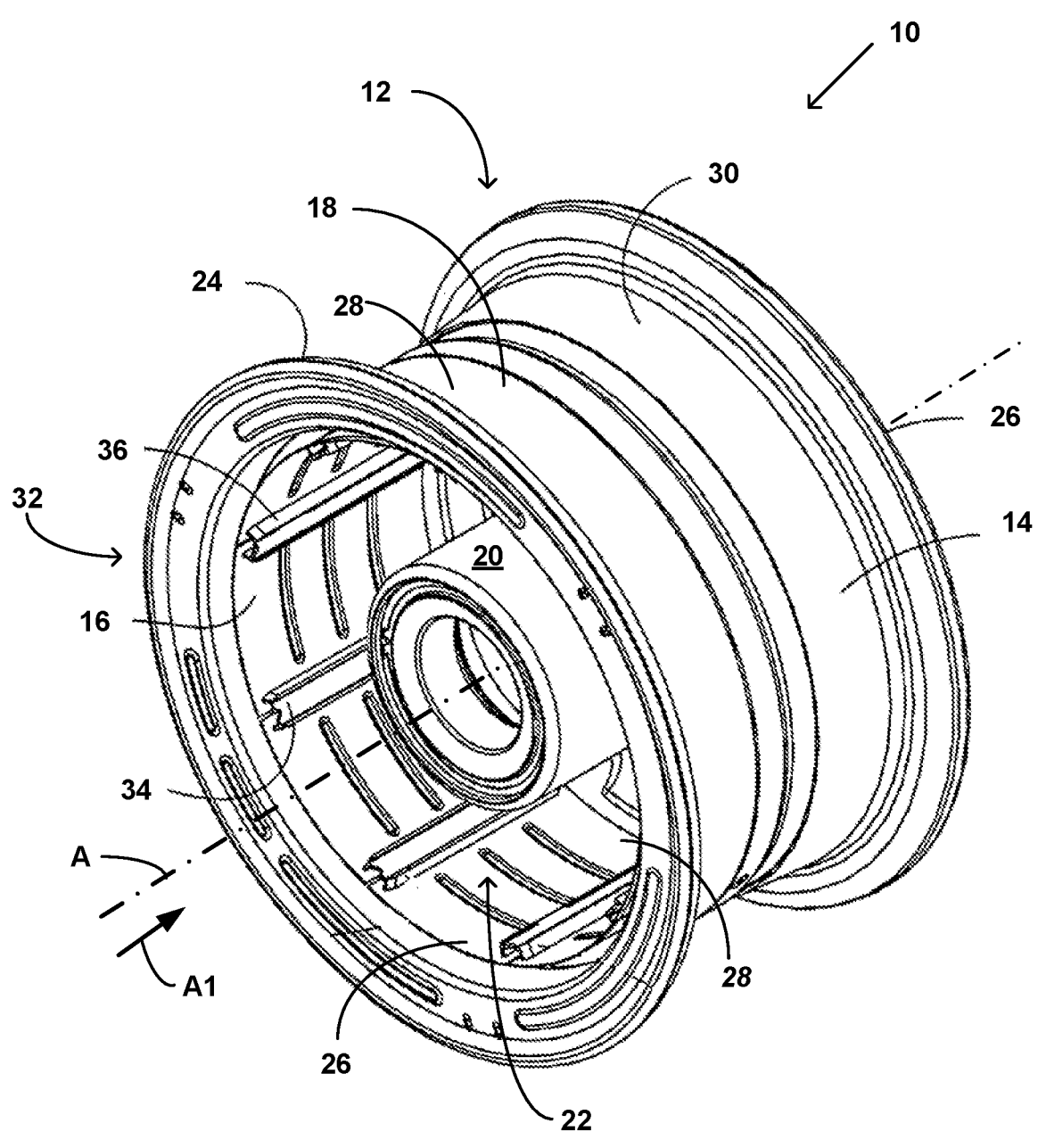
FIG. 1 is a perspective view illustrating an example wheel including a plurality of rotor drive keys on an interior surface of the wheel.

The disclosure describes articles, systems, and techniques relating to an assembly comprising a wheel and a brake assembly, and, in particular, to a piston-bushing assembly comprising an adjustment mechanism with a reduced profile within the piston-bushing assembly. The wheel is configured to rotate around a wheel axis. The brake assembly includes a disc stack which includes one or more rotor discs and one or more stator discs. For example, the disc stack may include a plurality of rotor discs interleaved with a plurality of stator discs. The rotor discs are rotationally coupled with the wheel, such that a rotation of the wheel around the wheel axis causes rotation of the rotor discs around the wheel axis. The stator discs are configured to remain substantially stationary relative to the wheel and the rotor discs. The brake assembly is configured to compress the disc stack to cause engagement of friction surfaces on the rotating rotor discs and the stationary stator discs, reducing a rotational speed of the rotor discs around the wheel axis. The rotor discs are configured to engage the wheel, such that the reduction in the rotational speed of the rotor discs causes a reduction in the speed of the wheel.

The brake assembly includes an actuator configured to compress the disc stack via the piston-bushing assembly to cause the slowing of the rotor discs and wheel. For example, the actuator may be configured to extend a piston from a bushing such that the piston compresses the disc stack. As the piston compresses the disc stack, the material of the disc stack may wear down, increasing a distance between the bushing and the disc stack. An adjustment mechanism within the piston-bushing assembly may be configured to allow the piston to extend further and further from the bushing as the material of the disc stack wears down, allowing for a consistent running clearance.

In a brake assembly, reducing the number and complexity of components can reduce the time and cost for assembly, as well as the weight of the assembly. Reducing weight may be particularly desirable to conserve the energy required for propulsion of the vehicle. Furthermore, reducing the complexity of the adjustment mechanism within the piston-bushing assembly of the brake assembly may allow more space in the adjustment mechanism to be occupied by the spring of the mechanism. Space for both small and large springs in an adjustment mechanism may provide a wider operating range of the piston-bushing assembly while using the same design, the larger spring providing adequate return force for the piston in higher-force braking applications. Reducing the complexity of the adjustment mechanism within the piston-bushing assembly may also allow the piston-bushing assembly to be smaller overall, allowing the piston to be actuated faster and requiring less energy for the actuation.

The present disclosure describes an adjustment mechanism of a piston-bushing assembly with a reduced profile. For example, the piston-bushing assembly may include a bushing with an opening through which the piston is slidably disposed. The piston may include a bottom end disposed within the bushing and an exterior end extending a distance outward from the opening of the bushing, wherein the exterior end is configured to engage with the disc stack of the brake assembly. The piston-bushing assembly may further include an adjuster tube disposed within the piston, wherein a length between a first end (e.g., the bottom end) of the adjuster tube and the bottom end (e.g., base) of the piston defines a step-back gap. An expander may be disposed within the adjuster tube and hold the adjuster tube in place through contact with the inner walls of the adjuster tube. When actuated, the bottom end of the piston may be configured to contact the first end of the adjuster tube and apply a compressive force to the adjuster tube. When the compressive force exceeds a threshold (e.g., when the force on the first end of the adjuster tube exceeds any forces from the expander holding the adjuster tube in place), the adjuster tube may slip over the expander, allowing the exterior end of the piston to extend further from the opening of the bushing.

The adjuster tube may be composed of any suitable material that is configured to slip over the expander when acted on by sufficient force, and is also configured not to buckle in response to the compressive force applied by the piston. By allowing the bottom end of the piston to contact and apply a force directly on the first end of the adjuster tube, the present design removes the need for intermediate parts in the assembly to transmit the force from the piston to a second end of the adjuster tube. This in turn reduces the design complexity of the assembly and provides one or more design advantages. For example, the lack of intermediate parts may allow more space in the piston-bushing design to accommodate a larger spring. In some examples the larger spring may be stronger than permitted by previous designs. In some examples the larger spring may provide the same spring forces, but undergo less stress during operation than a smaller spring designed with the same spring coefficient. In some examples, instead of increasing the size of the spring, the size of the piston and bushing may be reduced to improve the hydraulic response and stability of the piston-bushing assembly.

The piston-bushing assembly may also include a spring retainer and a spring disposed within the piston. The spring may seat against the bottom end of the piston and bias the spring retainer against the adjuster tube. The piston may form a generally cylindrical body defining an interior wall, and within which the spring and spring retainer are disposed. In some examples, the spring may form a helix (e.g., a helical spring) defining an outer surface and an inner surface. For example, an outer diameter of the helical spring may define the outer surface and an inner diameter of the helical spring may define the inner surface. The outer surface of the spring may be adjacent the interior wall of the piston, and the inner surface of the spring may be adjacent to an outer surface of the adjuster tube.

Because the spring biases the spring retainer against the adjuster tube, the spring retainer may apply a tensile force to the adjuster tube. The tensile force alone may be insufficient to allow the adjuster tube to slip over the expander. However, the tensile force in combination with the compressive force from the bottom end of the piston may act together to allow the adjuster tube to slip over the expander and, in turn, allow the piston to extend further from the bushing. Furthermore, the spring retainer may apply the tensile force to the adjuster tube before the compressive force is applied to the bottom end of the adjuster tube, providing a piloting feature for the adjuster tube to guide subsequent motion of the adjuster tube.

FIG. 1 is a perspective view illustrating an example wheel 10. In some examples, wheel 10 is a part of an aircraft vehicle. In other examples, wheel 10 may be a part of any other vehicle, such as, for example, any land vehicle or other vehicle. In the example shown in FIG. 1, wheel 10 includes a wheel rim 12 defining an exterior surface 14 and interior surface 16. Wheel rim 12 includes tubewell 18 and wheel hub 20. In some examples, interior surface 16 may include an inner diameter of tubewell 18 of wheel 10. For example, in some cases, interior surface 16 may be referred to as an inner diameter surface of wheel 10. Interior surface 16 and wheel hub 20 may define a wheel cavity 22 (e.g., a volume) between interior surface 16 and wheel hub 20. In some examples, a tire (not shown) may be mounted on exterior surface 14 of rim 12. Wheel 10 may include an inboard bead seat 24 and an outboard bead seat 26 configured to retain a tire on exterior surface 14 of rim 12. In examples, wheel 10 may comprise an inboard section 28 (e.g., including inboard bead seat 24) and an outboard section 30 (e.g., including outboard bead seat 26). Wheel 10 is configured to rotate around the axis of rotation A. An axial direction A1 of wheel 10 is parallel to the axis of rotation A and has a direction from inboard section 28 toward outboard section 30. In examples, the axial direction A1 is an outboard direction of wheel 10 and a direction opposite axial direction A1 is an inboard direction of wheel 10.

Wheel 10 includes a plurality of rotor drive keys 32 on interior surface 16 of wheel 10, such as rotor drive key 34 and rotor drive key 36. In some examples, each rotor drive key of the plurality of rotor drive keys 32 extends in a substantially axial direction of wheel 10 (e.g., in a direction parallel to the axis of rotation A). The plurality of rotor drive keys 32 ("rotor drive keys 32") and interior surface 16 are configured to be substantially stationary with respect to each other, such that when wheel 10 (and interior surface 16) rotates around axis of rotation A, each of the rotor drive keys (e.g., rotor drive keys 34, 36) translates over a closed path around axis A. Consequently, when wheel 10, interior surface 16, and rotor drive keys 32 are rotating around axis of rotation A, a force on one or more of rotor drive keys 32 opposing the direction of rotation acts to slow or cease the rotation. As will be discussed, rotor drive keys 32 may be configured to receive a torque from a braking system (not shown) configured to reduce and/or cease a rotation of wheel 10. Rotor drive keys 32 may be integrally formed with interior surface 16, or may be separate from and mechanically affixed to interior surface 16.

Figure 2:
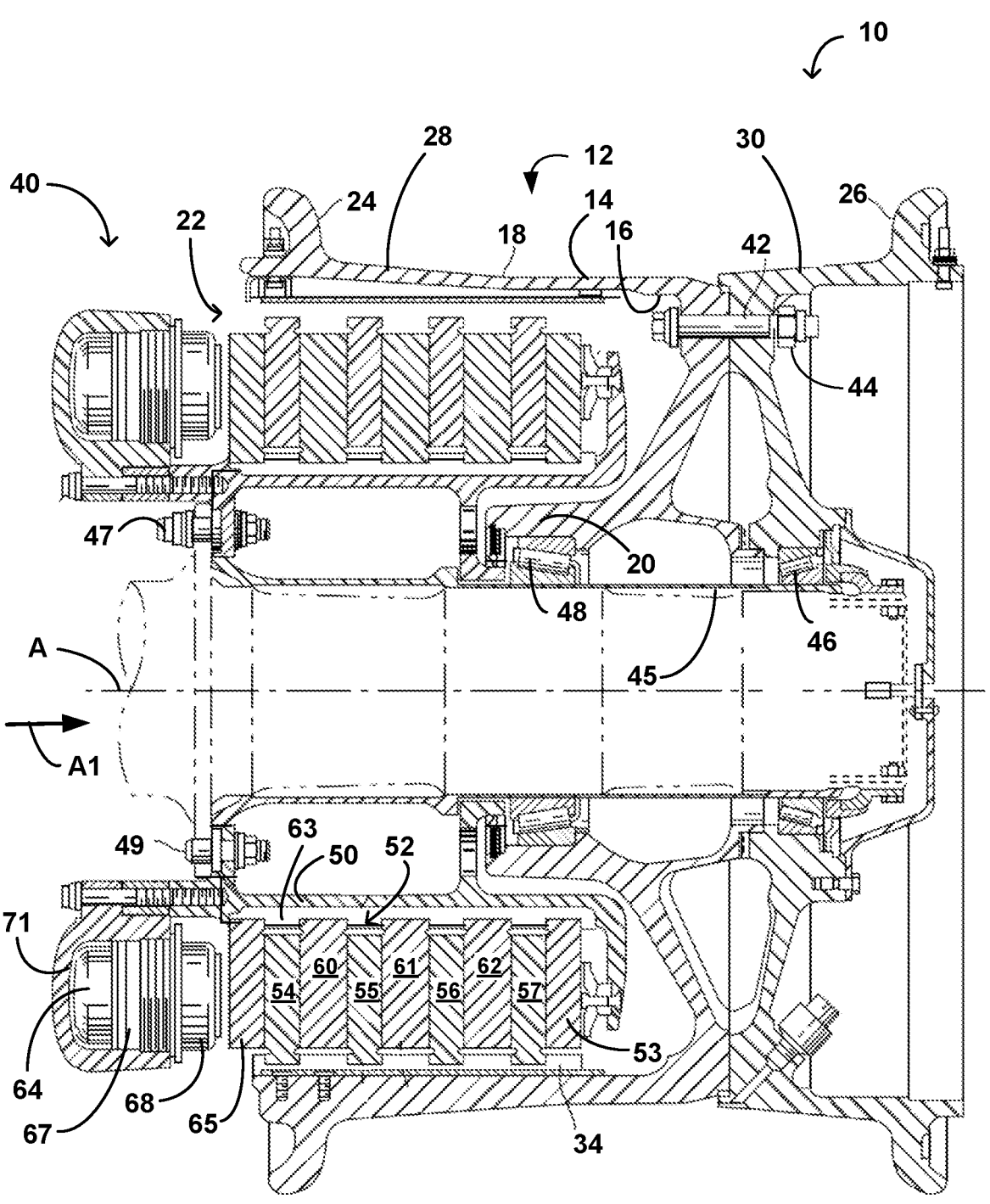
FIG. 2 is a schematic cross-sectional view illustrating an example wheel and brake assembly including the wheel of FIG. 1.

FIG. 2 is a schematic cross-sectional view illustrating wheel 10 and an example brake assembly 40. Wheel 10 includes wheel rim 12, exterior surface 14, interior surface 16, wheel cavity 22, wheel hub 20, inboard bead seat 24, outboard bead seat 26, inboard section 28, outboard section 30, and rotor drive key 34. FIG. 2 illustrates wheel rim 12 as a split rim wheel with lug bolt 42 and lug nut 44 connecting inboard section 28 and outboard section 30, however wheel rim 12 may utilize other configurations (e.g., a unified wheel rim) in other examples.

Wheel 10 is configured to rotate about axis A extending through axial assembly 45. Axial assembly 45 is configured to support wheel 10 while allowing wheel 10 to rotate around axis A using bearing 46 and bearing 48. For example, bearings 46, 48 may define a substantially circular track around axial assembly 45. A torque tube 50 may be coupled to axial assembly 45 such that torque tube 50 remains substantially rotationally stationary when wheel 10 rotates around axial assembly 45 and axis A. In the example shown in FIG. 2, torque tube 50 is directly coupled to axial assembly 45 via lugs 47 and 49, however, in other examples torque tube 50 may be indirectly coupled to axial assembly 45 via e.g., housing component 71. Torque tube 50 may at least partially surround an exterior of axial assembly 45. Axial assembly 45 may be mechanically coupled to a strut attached to a vehicle (e.g., a landing gear strut).

In the example shown in FIG. 2, brake assembly 40 is positioned within wheel 10 and is configured to engage main torque tube 50 and rotor drive key 34. Brake assembly 40 is configured to generate a torque to oppose a rotation of wheel 10 around axis A and transfer the torque to rotor drive key 34, reducing and/or eliminating the rotation of wheel 10 around axis A. Brake assembly 40 includes a disc stack 52 which includes one or more rotor discs (e.g., rotor discs 54, 55, 56, 57) and one or more stator discs (e.g., stator discs 60, 61, 62). Rotor discs 54, 55, 56, 57, and/or stator discs 60, 61, 62 may have any suitable configuration. For example, rotor discs 54, 55, 56, 57 and/or stator discs 60, 61, 62 can each be substantially annular discs surrounding axial assembly 45. Stator discs 60, 61, 62 are coupled to torque tube 50 via spline 63 and remain rotationally stationary with torque tube 50 (and axial assembly 45) as wheel 10 rotates. Rotor discs 54, 55, 56, 57 are rotationally coupled to rotor drive key 34 and interior surface 16 and rotate substantially synchronously with wheel 10 around axis A.

An actuator 64 is configured to compress disc stack 52 to bring friction surfaces of rotor discs 54, 55, 56, 57 into contact with friction surfaces of stator discs 60, 61, 62 generating shearing forces between the discs. The shearing forces cause rotor discs 54, 55, 56, 57 to exert a torque on rotor drive key 34 opposing a rotation of wheel 10. In some examples, actuator 64 is configured to compress disc stack 52 using a pressure plate 65. Actuator 64 may be configured to cause a piston 68 to translate relative to a body 67 of actuator 64 to compress disc stack 52. Actuator 64 may cause piston 68 to translate using any suitable method. In some examples, actuator 64 is configured to cause translation of piston 68 by supplying and/or venting a pressurized hydraulic fluid to or from a chamber between a bushing and the piston. In addition or instead, in some examples, actuator 64 is configured to cause piston 68 to translate through a motion (e.g., a rotary motion) generated by an electric motor. In the example shown in FIG. 2, actuator 64 is configured to compress disc stack 52 against a backing plate 53.

As actuator 64 compresses disc stack 52 via piston 68, friction wears down the discs of disk stack 52, requiring piston 68 to extend further and further relative to body 67 of actuator 64 to effectively compress disc stack 52. Piston 68 may be a part of a piston-bushing assembly that includes an adjustment mechanism configured to allow piston 68 to extend from body 67 a sufficient distance to engage with disc stack 52. The adjustment mechanism may also allow piston 68 to retract a consistent distance when piston 68 is not actuated, thereby allowing piston 68 to maintain a consistent running clearance between an exterior end of piston 68 and pressure plate 65 over the lifetime of the brake.

A housing 71 may be configured to partially or fully cover and/or protect one or more components of brake assembly 40, such as actuator body 67. Housing 71 may be configured to attach to torque tube 50 and/or another component of brake assembly 40 configured to remain substantially stationary with respect to torque tube 50. In some examples, housing 71 is configured to at least partially extend outside of wheel cavity 22 on a side of wheel 10 including inboard section 28 (e.g., an inboard side of wheel 10).

Wheel 10 may be used with any variety of private, commercial, or military aircraft or other type of vehicle. Wheel 10 may be mounted to a vehicle using, for example, bolts 47 and/or bolts 49, or some other fastening device. In some examples, wheel 10 may be retained on an axle of the vehicle by compressing bearing 48 and bearing 46 between the axle nut and ultimately a shoulder on the axle (e.g., the axle nut may be torqued against bearing 46 which may force bearing 48 to press against a shoulder of the torque tube assembly, further pressing the torque tube assembly against a shoulder on the axle). Axial assembly 45 may be mounted on a strut of a landing gear (not shown) or other suitable component of a vehicle to connect wheel 10 to the vehicle. Wheel 10 may rotate around axis A and axial assembly 45 to impart motion to the vehicle. Wheel 10 is shown and described to provide context to the brake assembly described herein, however the brake assembly described herein may be used with any suitable wheel assembly in other examples.

Figure 3:
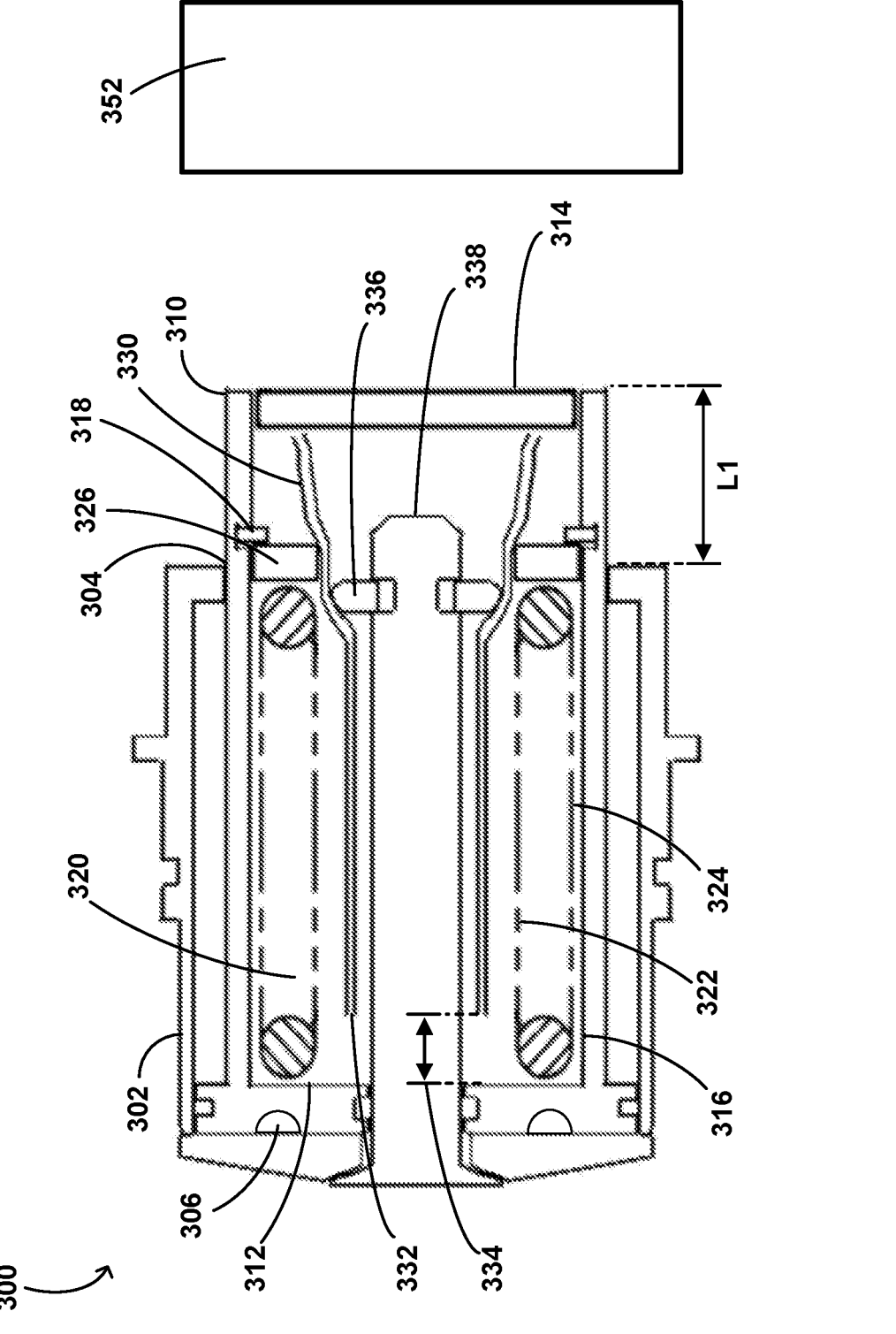
FIG. 3 is a plan view with selected cross-sections illustrating an example piston-bushing assembly in an unactuated state.

FIG. 3 is a plan view with selected cross-sections illustrating an example piston-bushing assembly 300 in an unactuated state. FIG. 3 depicts a cross-section of piston-bushing assembly 300, as well as cross-sections of parts of piston-bushing assembly 300, including bushing 302, piston 310, spring 320, spring retainer 326, shoulder 318, adjuster tube 330, expander 336, and adjuster pin 338. Piston 310 may be substantially similar to piston 68 of FIG. 2. An adjustment mechanism of piston-bushing assembly 300 may include spring 320, spring retainer 326, shoulder 318, adjuster tube 330, expander 336, and adjuster pin 338.

Step-back gap 334 within the adjustment mechanism of piston-bushing assembly 300 may define the distance that piston 310 may travel without utilizing the adjustment mechanism. That is, piston 310 may be slidably disposed within bushing 302 such that piston 310 may travel in and out of bushing 302 between a retracted state and an extended state. In the retracted state, spring 320 within piston 310 may hold piston 310 a distance away from disc stack 352 to avoid unnecessary friction in the brake assembly when braking is not desired. The distance between disc stack 352 and exterior end 314 of piston 310 when piston 310 is in a retracted state may be referred to as the running clearance. In the extended state, the actuator may extend piston 310 from bushing 302 such that piston 310 compresses disc stack 352 and ultimately applies a braking force to the wheel. As the material of disc stack 352 wears away, piston 310 may need to be allowed to extend further from bushing 302 to ensure contact and compression of disc stack 352. If only spring 320 were present within piston-bushing assembly 300, piston 310 would only be able to extend from bushing 302 until spring 320 reached its solid height. At which point replacement of disc stack 352 or other parts of piston-bushing assembly 300 may be necessitated. By including an adjustment mechanism within piston-bushing assembly 300, piston 310 may be allowed to extend further from bushing 302 without the need to replace parts of the system, allowing the brake assembly to function for longer periods without needing replacement parts. Piston 310 may extend and retract from bushing 302 based only on spring 320 until enough material has worn down from disc stack 352 that piston 310 travels far enough from its original position that it engages adjustment tube 330. In some examples, disc stack 352 may be positioned a distance away from exterior end 314 of piston 310 equal to or exceeding step-back gap 334.

In this way, the adjustment mechanism of piston-bushing assembly 300 may allow piston 310 to maintain a consistent running clearance between exterior end 314 of piston 310 and disc stack 352 over the lifetime of the brake. For example, in a first unactuated state, exterior end 314 of piston 310 may extend a first distance L1 from opening 304 of bushing 302, and exterior end 314 of piston 310 may be disposed a second distance from disc stack 352. After actuation of piston 310 to compress disc stack 352, material of disc stack 352 may wear away such that disc stack 352 is further from opening 304 than before actuation. After returning to the unactuated state, piston 310 may not retract fully back into bushing 302. Instead, the adjustment mechanism may allow piston 310 to retract back into bushing 302 only until the distance between exterior end 314 and disc stack 352 is substantially the same as before actuation of piston 310, i.e., the second distance. The new distance between exterior end 314 and opening 304 may be larger than first distance L1. In some examples, the adjustment mechanism may maintain a running clearance substantially equal to the length difference between the solid height and free length of spring 320.

Bushing 302 may include opening 304 through which piston 310 may slide. For example, an outer diameter of piston 310 may be manufactured with a close fit into an inner diameter of opening 304. In the example of FIG. 3, this close fit may allow piston 310 to slide right and left with respect to bushing 302 when acted on by an external force (e.g., hydraulic pressure in piston chamber 306). In some cases, piston-bushing assembly 300 may include lubricant between the outer diameter of piston 310 and the inner diameter of opening 304. In some examples, bushing 302 may fit and be secured within the housing of an actuator (e.g., actuator 64 of FIG. 2) of a brake assembly (e.g., brake assembly 40 of FIG. 2). For example, an external surface of bushing 302 may include screw threads to screw into a cavity within the actuator. In some examples, the actuator housing may function as bushing 302 for piston 310.

Piston 310 may define a generally cylindrical body with substantially closed ends. For example, piston 310 may include bottom end 312 disposed within bushing 302, while exterior end 314 extends a distance, L1, outward from opening 304 when piston-bushing assembly 300 is in the unactuated state. Bottom end 312 may be substantially closed, except for a central bore that allows piston 310 to fit over adjuster pin 338, allowing portions of adjuster pin 338 to be disposed inside piston 310. Exterior end 314 may include a cap and be configured to engage disc stack 352 of a braking system. For example, hydraulic pressure in piston chamber 306 may apply a force to bottom end 312 of piston 310 that pushes exterior end 314 outward from opening 304 to apply a mechanical force to disc stack 352 that ultimately applies a braking force to the wheel. Piston 310 may include one or more sealing mechanisms (e.g., o-rings) to prevent pressure within piston chamber 306 from leaking into the interior of piston 310, or out of piston-bushing assembly 300 between an external surface of piston 310 and an internal surface of bushing 302.

An actuator (e.g., actuator 64 of FIG. 1) of the brake assembly may be configured to actuate the brake assembly and slow the wheel(s) of the vehicle. The actuator may actuate the brake assembly by applying a force to piston 310 such that piston 310 extends outward from opening 304 to contact disc stack 352. In some examples, the actuator may be configured to apply a force to piston 310 by supplying and/or venting a pressurized hydraulic fluid to or from piston chamber 306 between an interior end of bushing 302 and bottom end 312 of piston 310. In addition, or instead, in some examples, the actuator may be configured to cause piston 310 to slidably translate within bushing 302 through a motion (e.g., a rotary motion) generated by an electric motor. FIG. 3 shows piston-bushing assembly 300 in an unactuated state, before a force is applied to piston 310 to slidably translate piston 310 and compress disc stack 352.

Figure 4:
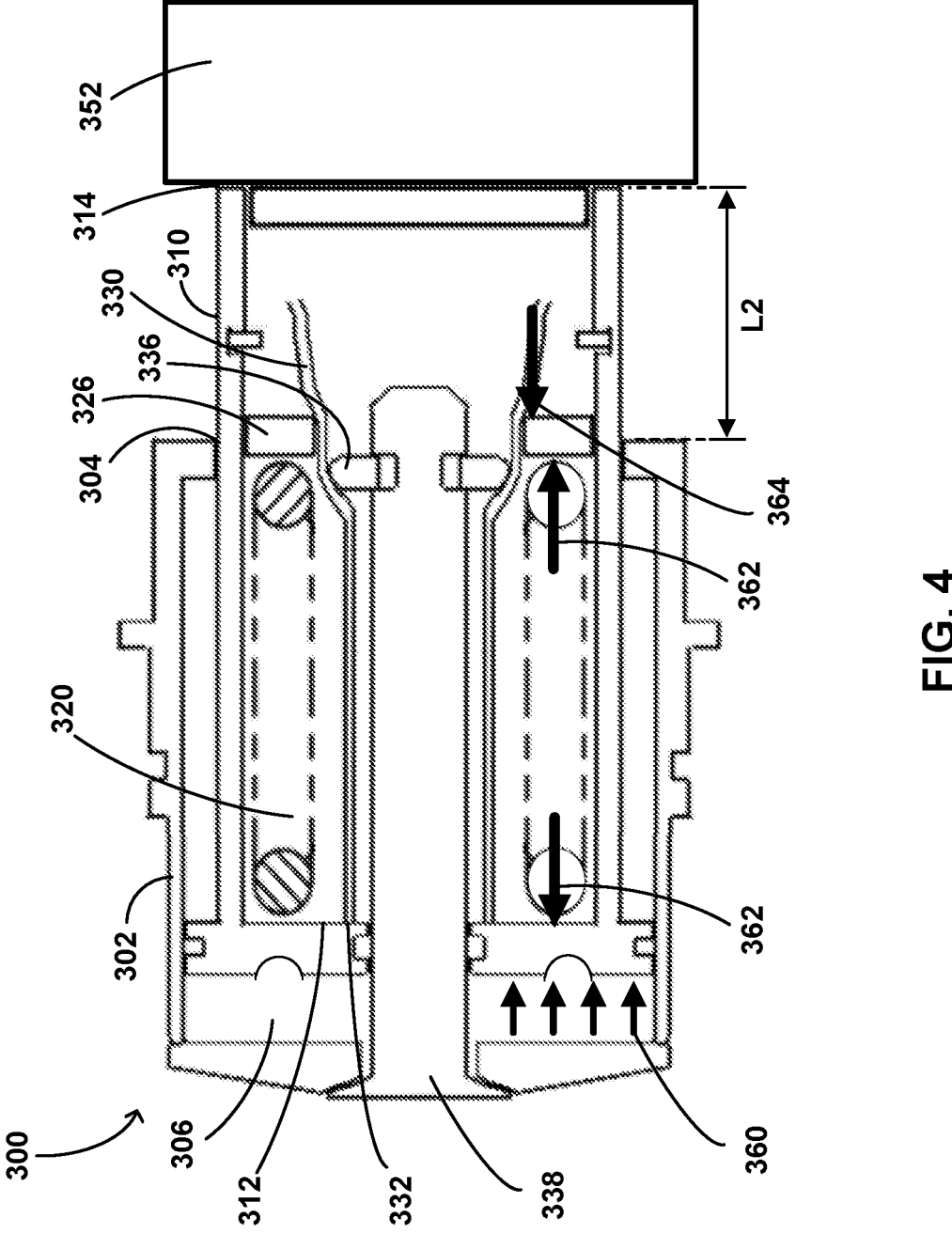
FIG. 4 is a plan view with selected cross-sections illustrating an example piston-bushing assembly in an actuated state before an adjuster tube slips over an expander of the piston-bushing assembly.
Figure 5:
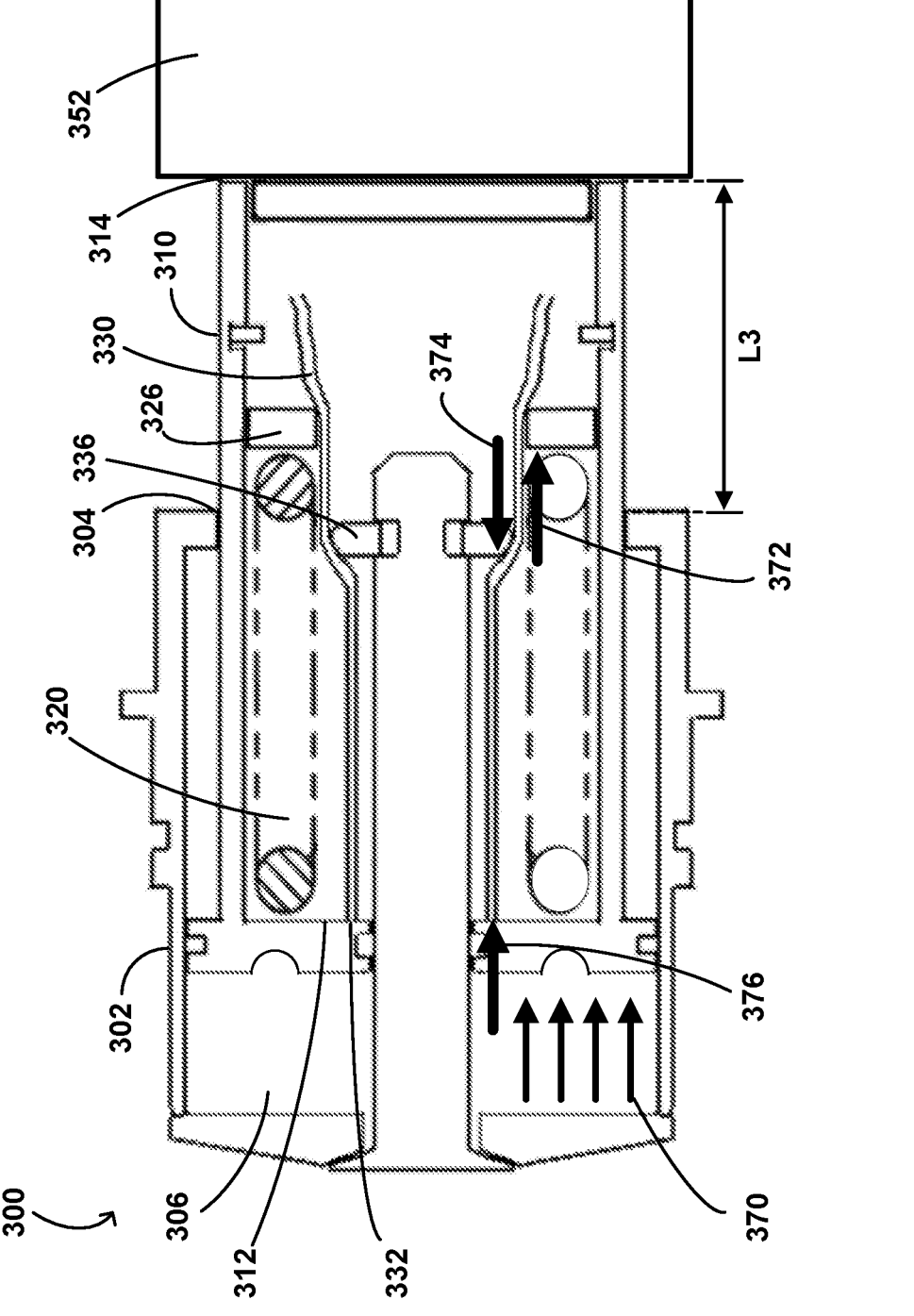
FIG. 5 is a plan view with selected cross-sections illustrating an example piston-bushing assembly in an actuated state after the adjuster tube slips over the expander.

Disc stack 352 as shown in FIGS. 3-5 may represent the component of the brake assembly of the vehicle against which piston 310 applies a force. In some examples, disc stack 352 may represent the disc within a disc stack (e.g., within disc stack 52 of FIG. 2) which is closest to piston 310. In some examples, disc stack 352 may be a pressure plate (e.g., pressure plate 65 of FIG. 2). The actuator may be configured to cause piston 310 to translate relative to bushing 302 to compress disc stack 352.

An interior of piston 310 may include an adjustment mechanism configured to allow piston 310 to return partially into the interior of bushing 302 after actuation of piston 310. For example, when hydraulic pressure in piston chamber 306 is released, the adjustment mechanism may be configured to apply a force to piston 310 that pushes/pulls piston 310 away from disc stack 352 and further into the interior of bushing 302. The adjustment mechanism may include spring 320, spring retainer 326, shoulder 318, adjuster tube 330, adjuster pin 338, and expander 336. Adjuster tube 330 may have a length defining a first end 332 and a second end. A length between first end 332 of adjuster tube 330 and bottom end 312 of piston 310 may define a step-back gap of the adjustment mechanism.

Adjuster tube 330 may have a length parallel to a length defined by piston 310. In some examples, adjuster tube 330 may be substantially cylindrical, and be disposed within piston 310 substantially concentric with piston 310. As shown in FIG. 3, first end 332 of adjuster tube 330 is closer to bottom end 312 of piston 310 than the second end of adjuster tube 330, and the second end of adjuster tube 330 is closer to exterior end 314 of piston 310 than first end 332. Adjuster tube 330 may have a flared section adjacent to the second end of adjuster tube 330, such that a diameter defined by the second end of adjuster tube 330 is larger than a diameter defined by first end 332 of adjuster tube 330.

Expander 336 may be disposed within adjuster tube 330 and be rigidly connected to adjuster pin 338. For example, expander 336 may be a snap-ring set within a recess in an outer surface of adjuster pin 338. Expander 336 may hold adjuster tube 330 in place through contact with a portion of the inner walls of adjuster tube 330. For example, expander 336 may define an outer diameter larger than the diameter defined by first end 332 of adjuster tube 330 and smaller than the diameter defined by the second end of adjuster tube 330. Adjuster tube 330 may be positioned around expander 336 at section along the length of adjuster tube 330 where an undeformed diameter of adjuster tube 330 is smaller or substantially equal to the outer diameter defined by expander 336. When subject to sufficient force, adjuster tube 330 may slip over expander 336 (e.g., in the example of FIG. 3, adjuster tube 330 may move to the right with respect to expander 336). As adjuster tube 330 slips over expander 336, adjuster tube 330 may stretch and expand to a larger cylindrical shape.

Adjuster tube 330 may be composed of any suitable material that is configured to slip over expander 336 when acted on by sufficient force, and that is also configured not to buckle in response to a compressive force applied to adjuster tube 330 by bottom end 312 of piston 310. For example, adjuster tube 330 may be composed of a metal alloy material. In some examples, adjuster tube may be composed primarily of stainless steel. In some examples, adjuster tube may be composed of a commercial metal alloy, for example Inconel® 600 and/or 300 series alloys. The metal alloy of adjuster tube 330 may be sufficiently ductile to allow adjuster tube 330 to deform and slip over expander 336 in response to sufficient force.

Shoulder 318 may be rigidly affixed within piston 310. For example, shoulder 318 may include a ring fit into a recess on the internal surface of piston 310. Shoulder 318 may prevent spring retainer 326 from translating with respect to piston 310 when spring retainer 326 contacts shoulder 318. For example, spring retainer 326 may be a washer disposed within piston 310 and configured to slidably translate along an internal wall of piston 310. Spring retainer 326 may be bounded on one side by one end of spring 320, and on the other side by a flared section of adjuster tube 330.

Spring 320 may be disposed within piston 310, and sit against bottom end 312 of piston 310. Spring 320 may bias spring retainer 326 against the flared section of adjuster tube 330. For example, spring 320 may be bounded on one side by bottom end 312 of piston 310 and on another side by spring retainer 326. In some examples, when piston-bushing assembly 300 is in the unactuated state as shown in FIG. 3, spring 320 may have a preload (e.g., spring 320 may be installed in piston-bushing assembly 300 with a spring length less than the free length of spring 320) that applies a small force to spring retainer 326. In some examples, when piston-bushing assembly 300 is in the unactuated state, spring 320 may be at or close to its free length. The force applied by spring 320 to spring retainer 326 due to the preload or at free length may be insufficient to pull adjuster tube 330 over expander 336. Furthermore, when piston-bushing assembly 300 is in the unactuated state, shoulder 318 may also prevent spring retainer 326 from pulling adjuster tube 330 over expander 336.

The generally cylindrical body of piston 310 may define interior wall 316. Spring 320 may be a compression spring defining an outer diameter 324 and an inner diameter 322. For example, outer diameter 324 of spring 320 may be adjacent to interior wall 316, and inner diameter 322 of spring 320 may be adjacent to adjuster tube 330. Because no other parts are necessary for the adjustment mechanism, there may be extra space available within piston 310 between interior wall 316 and adjuster tube 330. In some examples, that space may be occupied by a larger spring 320. This may allow for a larger variety of spring sizes and thus a larger variety of brake system applications for this design. For example, a larger spring 320 may have a larger spring coefficient then previously possible to provide higher spring forces. In some examples, a larger spring 320 may have the same spring coefficient as previous designs, but the larger size may allow the larger spring 320 to operate under more compression and expansion cycles without failure of the larger spring 320. In some examples, instead of increasing the size of spring 320 to occupy the extra space, the size of piston 310 and bushing 302 may be reduced to improve the hydraulic response and stability of piston-bushing assembly 300.

In some examples, spring 320 may be a helical compression spring, a wave compression spring, a coil spring, a flat wire coil spring, or any type of compression spring defining an inner diameter and outer diameter. For example, spring 320 may form a helix (e.g., a helical spring) defining an outer surface and an inner surface. In some examples, spring 320 may be a conical spring defining a minimum inner diameter and maximum outer diameter corresponding to inner diameter 322 and outer diameter 324, respectively.

FIG. 4 is a plan view with selected cross-sections illustrating the example piston-bushing assembly 300 in an actuated state before adjuster tube 330 slips over expander 336 of piston-bushing assembly 300.

An actuator of the brake assembly may supply an actuation force 360 to bottom end 312 of piston 310 (e.g., via hydraulic fluid within piston chamber 306). In response, piston 310 may slidably translate within bushing 302. For example, exterior end 314 of piston 310 may extend a distance L2 from opening 304 of bushing 302, wherein distance L2 is larger than distance L1 of FIG. 3. While piston 310 may be configured to translate with respect to bushing 302, adjuster pin 338, and therefore also expander 336, may remain stationary with respect to bushing 302. For example, adjuster pin 338 and expander 336 may remain stationary with respect to bushing 302 during actuation of piston-bushing assembly 300.

Actuation force 360 may cause spring 320 to compress. For example, spring retainer 326 may be bound on one side by a flared section of adjuster tube 330 that prevents spring retainer from translating with respect to adjuster tube 330. If adjuster tube 330 does not slip over expander 336, adjuster tube 330 may apply reactionary force 364 to spring 320 by way of spring retainer 326 to cause spring 320 to compress between spring retainer 326 and bottom end 312 of piston 310. As spring 320 is compressed, spring force 362 increases and applies a tensile force to adjuster tube 330 via spring retainer 326. The tensile force may act on a section of adjuster tube 330 between expander 336 and spring retainer 326. The tensile force may act to try to deform and pull adjuster tube 330 over expander 336. Spring force 362 alone may be insufficient to cause adjuster tube 330 to slip over expander 336. For example, piston-bushing assembly 300 may be designed such that spring 320 alone does not supply enough force, when compressed a distance up to and equal to the step-back gap, to cause adjuster tube 330 to deform and slip over expander 336.

Although FIG. 4 depicts exterior end 314 in contact with disc stack 352 before slippage of adjuster tube 330, in some examples, exterior end 314 of piston 310 does not contact disc stack 352 until after adjuster tube 330 has slipped over expander 336. Although FIG. 4 depicts exterior end 314 in contact with disc stack 352 at the distance L2, in some examples exterior end 314 may contact disc stack 352 at a distance less than L2, but greater than distance L1 of FIG. 3. For example, upon actuation, piston 310 may apply a force to disc stack 352 and thereby a braking force to a wheel of the vehicle before piston 310 translates a distance equal to the step-back gap. As the materials of exterior end 314 and/or disc stack 352 wear down, piston 310 may translate further with respect to bushing 302 until piston 310 has translated a distance equal to step-back gap 334 of FIG. 3, and exterior end 314 of piston 310 has extended distance L2 outward from opening 304 of piston 310.

Once piston 310 has translated a distance equal to step-back gap 334 of FIG. 3, bottom end 312 of piston 310 may contact first end 332 of adjuster tube 330. For example, when piston 310 has translated a distance equal to step-back gap 334 of FIG. 3, the difference between distance L2 of FIG. 4 and distance L1 of FIG. 3 is the step-back gap 334 of FIG. 3. In the example of FIG. 4, actuation force 360 may be balanced by spring force 362 such that actuation fore 360 does not yet result in a force between bottom end 312 of piston 310 and first end 332 of adjuster tube 330. Although actuation force 360 is depicted as a pressure, it may be understood that references to actuation force 360 include a resultant force on bottom end 312 of piston 310 due to pressure within piston chamber 306.

Adjuster tube 330 may prevent exterior end 314 of piston 310 from extending further than distance L2 away from opening 304 of bushing 302 until adjuster tube 330 slips over expander 336. For example, adjuster tube 330 may be substantially rigid along its length, such that when bottom end 312 of piston 310 is in contact with first end 332 of adjuster tube 330, interplay between expander 336 and adjuster tube 330 prevents adjuster tube 330 from moving and results in a force acting from first end 332 of adjuster tube 330 on bottom end 312 of piston 310.

FIG. 5 is a plan view with selected cross-sections illustrating the example piston-bushing assembly 300 of FIGS. 3 and 4 in an actuated state after adjuster tube 330 slips over expander 336.

As the materials of exterior end 314 of piston 310 and/or disc stack 352 wear down, exterior end 314 of piston 310 may need to extend further from opening 304 in order for piston 310 to continue to apply a force to disc stack 352 and result in braking of the wheel of the vehicle. For example, exterior end 314 may need to extend further than distance L2 of FIG. 4 from opening 304 in order for exterior end 314 to contact and apply a force to disc stack 352. For example, exterior end 314 may need to extend a distance L3 greater than distance L2 of FIG. 4 to contact and apply a force to disc stack 352. In order for exterior end 314 to extend further than distance L2 of FIG. 4, adjuster tube 330 may need to slip over expander 336.

After actuation, when piston 310 has translated a distance equal to step-back gap 334 of FIG. 3, bottom end 312 of piston 310 may contact first end 332 of adjuster tube 330 and apply a compressive force 376 to adjuster tube 330. Compressive force 376 may act to push adjuster tube 330 against expander 336. Compressive force 376 may be caused by actuation force 370 supplied by an actuator of the brake assembly on bottom end 312 of piston 310 (e.g., via hydraulic fluid within piston chamber 306). Actuation force 370 may be greater than actuation force 360 of FIG. 4. For example, actuation force 370 may be greater than spring force 362 of FIG. 4, such that actuation force 370 causes bottom end 312 of piston 310 to exert compressive force 376 on first end 332 of adjuster tube 330.

Adjuster tube 330 may be configured to slip over expander 336 in response to compressive force 376 exceeding a threshold. For example, expander 336 may hold adjuster tube 330 in place through contact with an interior surface of adjuster tube 330, resulting in expander force 374. The threshold may be defined by expander force 374. In some examples, adjuster tube 330 may be configured to slip over expander 336 in response to compressive force 376 exceeding expander force 374. In order for adjuster tube 330 to slip over expander 336, the material of adjuster tube 330 at expander 336 may plastically deform. For example, adjuster tube 330 may define a first diameter from first end 332 of adjuster tube 330 to a portion of adjuster tube 330 in close proximity to expander 336. In order for adjuster tube 330 to slip over expander 336, the portions of adjuster tube 330 translating across expander 336 may deform to a second diameter that is larger than the first diameter. Expander force 374 may represent a resistance of the material of adjuster tube 330 to deformation, as well as friction forces between adjuster tube 330 and expander 336. Expander force 374 may also be a reactionary force. For example, the magnitude of expander force 374 may be dependent on the magnitude of other forces acting on adjuster tube 330 (e.g., compressing force 376 and tensile force 372). In some examples, the threshold for compressive force 376 to exceed in order for adjuster tube 330 to slip over expander 336 may be defined by the largest possible expander force 374 before adjuster tube 330 deforms and translates with respect to expander 336. When adjuster tube 330 slips over expander 336, adjuster tube 330 may allow exterior end 314 of piston 310 to extend distance L3 outward from opening 304 of bushing 302.

In some examples, Adjuster tube 330 may be configured to slip over expander 336 in response to a combination of both compressive force 376 and tensile force 372 exceeding the threshold. For example, spring retainer 326 may apply the spring force as tensile force 372 to adjuster tube 330 while actuation force 370 and bottom end 312 apply compressive force 376 to first end 332 of adjuster tube 330. Adjuster tube 330 may be configured to slip over expander 336 in response to the sum of both compressive force 376 and tensile force 372 exceeding expander force 374, allowing exterior end 314 of piston 310 to extend distance L3 outward from opening 304 of bushing 302.

Adjuster tube 330 may be configured not to buckle in response to compressive force 376. For example, adjuster tube 330 may be made of one or more metal alloys configured to be sufficiently stiff so as not to buckle under a range of operating forces for piston-bushing assembly 300. Adjuster tube 330 may also be configured to slip over expander 336 in response to forces within piston-bushing assembly 300 exceeding a threshold (e.g., compressive force 376 alone or compressive force 376 in combination with tensile force 372 exceeding expander force 374). For example, adjuster tube 330 may be made of one or more metal alloys configured to stretch and/or deform around expander 336 in response to sufficient force.

Once braking is no longer desired, an actuator may remove actuation force 370 (e.g., vent hydraulic pressure from piston chamber 306). In response, spring 320 may push piston 310 back into bushing 302 via energy stored in the spring, removing contact between exterior end 314 and disc stack 352.

In some examples, a method includes compressing a disc stack of a brake assembly using a piston-bushing assembly of the brake assembly as described herein. The present disclosure includes the following examples.

Example 1: A piston-bushing assembly including: a bushing including an opening; a piston slidably disposed within the bushing, the piston including: a bottom end disposed within the bushing; and an exterior end extending a distance outward from the opening of the bushing and configured to engage with a disc stack of a brake assembly; and an adjuster tube including a first end of the adjuster tube, wherein, when the piston-bushing assembly is in an unactuated state, a length between the first end of the adjuster tube and the bottom end of the piston defines a step-back gap.

Example 2: The piston-bushing assembly of example 1 further including an expander disposed within the adjuster tube, wherein the distance includes a first distance; wherein the bottom end of the piston is configured to contact the first end of the adjuster tube and apply a compressive force to the adjuster tube, and wherein the adjuster tube is configured to slip over the expander in response to the compressive force exceeding a threshold, allowing the exterior end of the piston to extend a second distance outward from the opening of the bushing wherein the second distance is larger than the first distance.

Example 3: The piston-bushing assembly of example 2, wherein the adjuster tube is configured not to buckle in response to the compressive force.

Example 4: The piston-bushing assembly of any of examples 1-3, further including: a spring retainer disposed within the piston; and a spring disposed within the piston, wherein the spring sits against the bottom end of the piston and biases the spring retainer against the adjuster tube.

Example 5: The piston-bushing assembly of example 4, wherein the piston includes a generally cylindrical body defining an interior wall, wherein the spring includes a helix defining an outer diameter and an inner diameter, wherein the outer diameter of the spring is adjacent the interior wall, and wherein the inner diameter of the spring is adjacent the adjuster tube.

Example 6: The piston-bushing assembly of example 4 or 5, further including an expander disposed within the adjuster tube, wherein the distance includes a first distance; wherein the spring retainer is configured to apply a tensile force to the adjuster tube, and wherein the adjuster tube is configured to slip over the expander at least partially in response to the tensile force, allowing the exterior end of the piston to extend a second distance outward from the opening of the bushing wherein the second distance is larger than the first distance.

Example 7: The piston-bushing assembly of example 6, wherein the bottom end of the piston is configured to contact the first end of the adjuster tube and apply a compressive force to the adjuster tube, and wherein the adjuster tube is configured to slip over the expander in response to a combination of both the compressive force and the tensile force exceeding a threshold, allowing the exterior end of the piston to extend the second distance outward from the opening of the bushing.

Example 8: The piston-bushing assembly of any of examples 1-7, wherein the adjuster tube includes a metal alloy material.

Example 9: The piston-bushing assembly of any of examples 1-8, further including an actuator configured to cause the exterior end of the piston to translate outward from the bushing in response to one or more of a pressurized hydraulic fluid and/or an electric motor.

Example 10: An assembly including: a wheel configured to rotate around a wheel axis; a brake assembly including: a disc stack including a rotor disc and a stator disc, wherein the rotor disc is rotationally coupled to the wheel, and wherein the wheel is configured to rotate relative to the stator disc; and an actuator configured to compress the disc stack via a piston-bushing assembly including: a bushing including an opening; a piston slidably disposed within the bushing, including: a bottom end disposed within the bushing; and an exterior end extending a distance outward from the opening of the bushing and configured to engage with the disc stack of the brake assembly; and an adjuster tube including a first end of the adjuster tube, wherein, when the piston-bushing assembly is in an unactuated state, a length between the first end of the adjuster tube and the bottom end of the piston defines a step-back gap.

Example 11: The assembly of example 10 further including an expander disposed within the adjuster tube, wherein the distance includes a first distance; wherein the bottom end of the piston is configured to contact the first end of the adjuster tube and apply a compressive force to the adjuster tube, and wherein the adjuster tube is configured to slip over the expander in response to the compressive force exceeding a threshold, allowing the exterior end of the piston to extend a second distance outward from the opening of the bushing wherein the second distance is larger than the first distance.

Example 12: The assembly of example 11, wherein the adjuster tube is configured not to buckle in response to the compressive force.

Example 13: The assembly of any of examples 10-12, further including: a spring retainer disposed within the piston; and a spring disposed within the piston, wherein the spring sits against the bottom end of the piston and biases the spring retainer against the adjuster tube.

Example 14: The assembly of example 13, wherein the piston includes a generally cylindrical body defining an interior wall, wherein the spring includes a helix defining an outer diameter and an inner diameter, wherein the outer diameter of the spring is adjacent the interior wall, and wherein the inner diameter of the spring is adjacent the adjuster tube.

Example 15: The assembly of example 13 or 14, further including an expander disposed within the adjuster tube, wherein the distance includes a first distance; wherein the spring retainer is configured to apply a tensile force to the adjuster tube, and wherein the adjuster tube is configured to slip over the expander at least partially in response to the tensile force, allowing the exterior end of the piston to extend a second distance outward from the opening of the bushing wherein the second distance is larger than the first distance.

Example 16: The assembly of example 15, wherein the bottom end of the piston is configured to contact the first end of the adjuster tube and apply a compressive force to the adjuster tube, and wherein the adjuster tube is configured to slip over the expander in response to a combination of both the compressive force and the tensile force exceeding a threshold, allowing the exterior end of the piston to extend the second distance outward from the opening of the bushing.

Example 17: The assembly of any of examples 11-16, wherein the expander is configured to remain stationary with respect to the bushing during actuation of the piston-bushing assembly.

Example 18: The assembly of any of examples 10-17, wherein the adjuster tube includes a metal alloy material.

Example 19: The assembly of any of examples 10-18, wherein compression of the disc stack results in a braking force applied to the wheel.

Example 20: The assembly of any of examples 10-19, wherein the actuator is configured to cause the exterior end of the piston to translate outward from the bushing in response to one or more of a pressurized hydraulic fluid and/or an electric motor.

Various examples have been described. These and other examples are within the scope of the following claims.

What is claimed is:

1. A piston-bushing assembly comprising:
a bushing comprising an opening;
a piston slidably disposed within the bushing, the piston comprising:
a bottom end disposed within the bushing; and
an exterior end extending a distance outward from the opening of the bushing and
configured to engage with a disc stack of a brake assembly;
an adjuster tube comprising a first end of the adjuster tube; and
an expander disposed within the adjuster tube,
wherein when the piston-bushing assembly is in an unactuated state, a length between the first end of the adjuster tube and the bottom end of the piston defines a step-back gap, and
wherein when the piston-bushing assembly is in an actuated state, an actuation force causes the bottom end of the piston to directly contact the first end of the adjuster tube and apply a compressive force between the bottom end of the piston and the expander to cause the adjuster tube to slip over the expander in response to the compressive force exceeding a threshold.

2. The piston-bushing assembly of claim 1,
wherein the distance comprises a first distance, and
wherein the adjuster tube is configured to slip over the expander in response to the compressive force exceeding threshold to allow the exterior end of the piston to extend a second distance outward from the opening of the bushing wherein the second distance is larger than the first distance.

3. The piston-bushing assembly of claim 2, wherein the adjuster tube is configured not to buckle in response to the compressive force.

4. The piston-bushing assembly of claim 1, further comprising:
a spring retainer disposed within the piston; and
a spring disposed within the piston, wherein the spring sits against the bottom end of the piston and biases the spring retainer against the adjuster tube.

5. The piston-bushing assembly of claim 4,
wherein the piston comprises a generally cylindrical body defining an interior wall,
wherein the spring comprises a helix defining an outer diameter and an inner diameter,
wherein the outer diameter of the spring is adjacent the interior wall, and
wherein the inner diameter of the spring is adjacent the adjuster tube.

6. The piston-bushing assembly of claim 4,
wherein the distance comprises a first distance;
wherein the spring retainer is configured to apply a tensile force to the adjuster tube, and
wherein the adjuster tube is configured to slip over the expander at least partially in response to the tensile force to allow the exterior end of the piston to extend a second distance outward from the opening of the bushing wherein the second distance is larger than the first distance.

7. The piston-bushing assembly of claim 6,
wherein the adjuster tube is configured to slip over the expander in response to a combination of both the compressive force and the tensile force exceeding the threshold, allowing the exterior end of the piston to extend the second distance outward from the opening of the bushing.

8. The piston-bushing assembly of claim 1, wherein the adjuster tube comprises a metal alloy material.

9. The piston-bushing assembly of claim 1, further comprising an actuator configured to cause the exterior end of the piston to translate outward from the bushing in response to one or more of a pressurized hydraulic fluid and/or an electric motor.

10. An assembly comprising:
a wheel configured to rotate around a wheel axis;
a brake assembly comprising:
a disc stack comprising a rotor disc and a stator disc, wherein the rotor disc is rotationally coupled to the wheel, and wherein the wheel is configured to rotate relative to the stator disc; and
an actuator configured to compress the disc stack via a piston-bushing assembly comprising:
a bushing comprising an opening;
a piston slidably disposed within the bushing, comprising:
a bottom end disposed within the bushing; and
an exterior end extending a distance outward from the opening of the bushing and configured to engage with the disc stack of the brake assembly;
an adjuster tube comprising a first end of the adjuster tube; and
an expander disposed within the adjuster tube,
wherein when the piston-bushing assembly is in an unactuated state, a length between the first end of the adjuster tube and the bottom end of the piston defines a step-back gap, and
wherein the actuator is configured to actuate the piston-bushing assembly and cause an actuation force to push on and cause the bottom end of the piston to directly contact the first end of the adjuster tube and apply a compressive force between the bottom end of the piston and the expander to cause the adjuster tube to slip over the expander in response to the compressive force exceeding a threshold.

11. The assembly of claim 10,
wherein the distance comprises a first distance, and
wherein the adjuster tube is configured to slip over the expander in response to the compressive force exceeding a threshold to allow the exterior end of the piston to extend a second distance outward from the opening of the bushing wherein the second distance is larger than the first distance.

12. The assembly of claim 11, wherein the adjuster tube is configured not to buckle in response to the compressive force.

13. The assembly of claim 10, further comprising:
a spring retainer disposed within the piston; and
a spring disposed within the piston, wherein the spring sits against the bottom end of the piston and biases the spring retainer against the adjuster tube.

14. The assembly of claim 13,
wherein the piston comprises a generally cylindrical body defining an interior wall,
wherein the spring comprises a helix defining an outer diameter and an inner diameter, wherein the outer diameter of the spring is adjacent the interior wall, and wherein the inner diameter of the spring is adjacent the adjuster tube.

15. The assembly of claim 13, wherein the distance comprises a first distance;

wherein the spring retainer is configured to apply a tensile force to the adjuster tube, and wherein the adjuster tube is configured to slip over the expander at least partially in response to the tensile force to allow the exterior end of the piston to extend a second distance outward from the opening of the bushing wherein the second distance is larger than the first distance.

16. The assembly of claim 15, wherein the adjuster tube is configured to slip over the expander in response to a combination of both the compressive force and the tensile force exceeding the threshold, allowing the exterior end of the piston to extend the second distance outward from the opening of the bushing.

17. The assembly of claim 11, wherein the expander is configured to remain stationary with respect to the bushing during actuation of the piston-bushing assembly.

18. The assembly of claim 10, wherein the adjuster tube comprises a metal alloy material.

19. The assembly of claim 10, wherein compression of the disc stack results in a braking force applied to the wheel.

20. The assembly of claim 10, wherein the actuator is configured to cause the exterior end of the piston to translate outward from the bushing in response to one or more of a pressurized hydraulic fluid and/or an electric motor.

\* \* \* \* \*